(12) United States Patent
Zhang et al.

(10) Patent No.: US 10,976,797 B2
(45) Date of Patent: *Apr. 13, 2021

(54) SMART BATTERY BALANCE SYSTEM AND METHOD

(71) Applicant: Hand Held Products, Inc., Fort Mill, SC (US)

(72) Inventors: Zhenjun Zhang, Jiangsu (CN); Chao Cao, Jiangsu (CN); Jinhua Shen, Jiangsu (CN); Jinchao Shi, Jiangsu (CN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,572

(22) Filed: Jan. 14, 2020

(65) Prior Publication Data

US 2020/0150740 A1 May 14, 2020

Related U.S. Application Data

(63) Continuation of application No. 15/829,167, filed on Dec. 1, 2017, now Pat. No. 10,698,470.

(30) Foreign Application Priority Data

Dec. 9, 2016 (CN) .......................... 201611130208.0

(51) Int. Cl.
*G06F 1/3212* (2019.01)
*G06F 1/26* (2006.01)
(Continued)

(52) U.S. Cl.
CPC .......... *G06F 1/3212* (2013.01); *G06F 1/1632* (2013.01); *G06F 1/263* (2013.01);
(Continued)

(58) Field of Classification Search
CPC ...... G06F 1/3212; G06F 1/1632; G06F 1/266; G06F 1/263; G06F 1/3287;
(Continued)

(56) References Cited

U.S. PATENT DOCUMENTS

| 5,461,717 A | * | 10/1995 | Notarianni | ............ G06F 1/1632 361/727 |
| 5,523,671 A | * | 6/1996 | Stewart | ..................... H02J 7/34 320/152 |

(Continued)

FOREIGN PATENT DOCUMENTS

| WO | 2013/163789 A1 | 11/2013 |
| WO | 2013/173985 A1 | 11/2013 |

(Continued)

OTHER PUBLICATIONS

Final Rejection dated Aug 13, 2019 for U.S. Appl. No. 15/829,167.

(Continued)

*Primary Examiner* — M Baye Diao
(74) *Attorney, Agent, or Firm* — Alston & Bird LLP

(57) ABSTRACT

A smart battery power balance system and method to maximize the operating life of a mobile computing device and a portable peripheral (e.g., a peripheral having scanning capability). The mobile computing device battery and portable peripheral battery parameters such as battery level, velocity/rate of consumption and usage history are collected. A curve fitting and estimation is done to predict the empty time for complete battery discharge of the mobile computing device and portable peripheral. Based on this analysis, if the calculated empty time of the mobile computing device battery is less than the portable peripheral battery, the portable peripheral charges the mobile computing device battery and if the calculated empty time of the mobile computing device battery is greater than that of the portable (Continued)

peripheral battery, the portable peripheral battery does not charge the mobile computing battery.

20 Claims, 6 Drawing Sheets

(51) Int. Cl.
*H02J 7/00* (2006.01)
*G06F 1/3287* (2019.01)
*H02J 7/34* (2006.01)
*G06F 1/16* (2006.01)

(52) U.S. Cl.
CPC ............ *G06F 1/266* (2013.01); *G06F 1/3287* (2013.01); *H02J 7/0014* (2013.01); *H02J 7/0021* (2013.01); *H02J 7/0047* (2013.01); *H02J 7/342* (2020.01); *G06F 2200/1633* (2013.01); *H02J 7/00* (2013.01); *H02J 7/0048* (2020.01)

(58) Field of Classification Search
CPC . G06F 2200/1633; H02J 7/0047; H02J 7/342; H02J 7/0021; H02J 7/0014; H02J 7/00; H02J 7/0048; Y02D 10/00
USPC .......................................................... 713/310
See application file for complete search history.

(56) References Cited

U.S. PATENT DOCUMENTS

| | | | |
|---|---|---|---|
| 5,666,066 A | 9/1997 | Jo | |
| 5,998,972 A * | 12/1999 | Gong | H02J 7/0077 320/134 |
| 6,617,829 B1 * | 9/2003 | Smith | H02J 7/0047 320/134 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 7,902,794 B2 * | 3/2011 | Ahmad | H02J 7/0031 320/137 |
| 8,001,419 B2 * | 8/2011 | Killian | G06F 1/263 714/14 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,583,955 B2 | 11/2013 | Lu et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre, Jr. | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz, Sr. | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Du et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |

(56) References Cited

U.S. PATENT DOCUMENTS

| | | |
|---|---|---|
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,817 B2 | 9/2014 | Glanzer et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,026,187 B2 * | 5/2015 | Huang ............... H02J 7/0047 455/575.8 |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,237,211 B2 * | 1/2016 | Tabe ............... H04M 1/72522 |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |

(56) References Cited

U.S. PATENT DOCUMENTS

| | | |
|---|---|---|
| 9,262,660 B2 | 2/2016 | Lu et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,282,501 B2 | 3/2016 | Wang et al. |
| 9,286,496 B2 | 3/2016 | Smith |
| 9,292,969 B2 | 3/2016 | Laffargue et al. |
| 9,297,900 B2 | 3/2016 | Jiang |
| 9,298,667 B2 | 3/2016 | Caballero |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,342,827 B2 | 5/2016 | Smith |
| 9,355,294 B2 | 5/2016 | Smith et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,367,722 B2 | 6/2016 | Xian et al. |
| 9,371,067 B2* | 6/2016 | Dao ................. B60W 10/26 |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,411,386 B2 | 8/2016 | Sauerwein, Jr. |
| 9,412,242 B2 | 8/2016 | Van et al. |
| 9,418,252 B2 | 8/2016 | Nahill et al. |
| 9,418,269 B2 | 8/2016 | Havens et al. |
| 9,418,270 B2 | 8/2016 | Van et al. |
| 9,423,318 B2 | 8/2016 | Liu et al. |
| 9,429,992 B1* | 8/2016 | Ashenbrenner ..... G06F 13/4081 |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,582,696 B2 | 2/2017 | Barber et al. |
| 9,606,581 B1 | 3/2017 | Howe et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho |
| 9,659,198 B2 | 5/2017 | Giordano et al. |
| 9,660,477 B2* | 5/2017 | Dowd ................. H02J 50/10 |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2006/0164036 A1* | 7/2006 | Ulla ................. H02J 7/0063 320/114 |
| 2007/0063048 A1 | 3/2007 | Havens et al. |
| 2007/0294546 A1* | 12/2007 | Lee .................. G06F 1/3215 713/300 |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0176000 A1* | 7/2013 | Bishop ................. H02J 7/0047 320/149 |
| 2013/0201316 A1* | 8/2013 | Binder .................. H04L 67/12 348/77 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0332524 A1 | 12/2013 | Fiala et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |

(56) References Cited

U.S. PATENT DOCUMENTS

| | | |
|---|---|---|
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0176041 A1* | 6/2014 | Sun .................. G06F 1/32 320/101 |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0217984 A1 | 8/2014 | Banerjee et al. |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0031452 A1 | 1/2015 | Rundell et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |

(56) References Cited

U.S. PATENT DOCUMENTS

| | | |
|---|---|---|
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0194833 A1* | 7/2015 | Fathollahi ............ H02J 7/0044 320/114 |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley et al. |
| 2015/0310389 A1 | 10/2015 | Crimm et al. |
| 2015/0324181 A1* | 11/2015 | Segal ................. H04W 52/0264 717/178 |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0336623 A1* | 11/2016 | Nayar ..................... H01M 4/44 |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |

(56) References Cited

U.S. PATENT DOCUMENTS

| | | | |
|---|---|---|---|
| 2017/0180577 | A1 | 6/2017 | Nguon et al. |
| 2017/0181299 | A1 | 6/2017 | Shi et al. |
| 2017/0190192 | A1 | 7/2017 | Delario et al. |
| 2017/0193432 | A1 | 7/2017 | Bernhardt |
| 2017/0193461 | A1 | 7/2017 | Celinder et al. |
| 2017/0193727 | A1 | 7/2017 | Van et al. |
| 2017/0200108 | A1 | 7/2017 | Au et al. |
| 2017/0200275 | A1 | 7/2017 | McCloskey et al. |
| 2018/0120915 | A1* | 5/2018 | Li ..................... G06F 1/3212 |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

Non-Final Rejection dated Apr 5, 2019 for U.S. Appl. No. 15/829,167.
Notice of Allowance and Fees Due (PTOL-85) dated Feb 20, 2020 U.S. Appl. No. 15/829,167.
Notice of Allowance and Fees Due (PTOL-85) dated Oct 22, 2019 for U.S. Appl. No. 15/829,167.
U.S. Patent Application Brian L Jovanovski et al., filed Jun. 23, 2015, not published yet, Dual-Projector Three-Dimensional Scanner; 40 pages [Previously cited and copy provided in parent application], U.S. Appl. No. 14/747,490.
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
U.S. Patent Application for a Mobile-Phone Adapter for Electronic Transactions, filed Jul. 10, 2014 (Hejl), U.S. Appl. No. 14/327,827.
U.S. Patent Application for a System and Method for Indicia Verification, filed Jul. 18, 2014 (Hejl), U.S. Appl. No. 14/334,934.
U.S. Patent Application for Adaptable Interface for a Mobile Computing Device filed Oct. 31, 2014 (Schoon et al.), U.S. Appl. No. 14/529,563.
U.S. Patent Application for Aimer for Barcode Scanning filed Mar. 31, 2015 (Bidwell), U.S. Appl. No. 14/674,329.
U.S. Patent Application for an Axially Reinforced Flexible Scan Element, filed Jul. 25, 2014 (Reublinger et al.); 41 pages, U.S. Appl. No. 14/340,627.
U.S. Patent Application for Apparatus and Methods for Monitoring One or More Portable Data Terminals (Caballero et al.), U.S. Appl. No. 14/725,352.
U.S. Patent Application for Application Independent DEX/UCS Interface filed May 8, 2015 (Pape), U.S. Appl. No. 14/707,123.
U.S. Patent Application for Augumented Reality Enabled Hazard Display filed May 19, 2015 (Venkatesha et al.), U.S. Appl. No. 14/715,672.
U.S. Patent Application for Auto-Contrast Viewfinder for an Indicia Reader filed Dec. 12, 2014 (Todeschini), U.S. Appl. No. 14/568,305.
U.S. Patent Application for Autofocus Lens System for Indicia Readers filed Apr. 29, 2014 (Ackley et al.), U.S. Appl. No. 14/264,173.
U.S. Patent Application for Barcode Reader With Security Features filed Oct. 31, 2014 (Todeschini et al.), U.S. Appl. No. 14/529,857.
U.S. Patent Application for Barcode Scanning System Using Wearable Device With Embedded Camera filed Nov. 5, 2014 (Todeschini), U.S. Appl. No. 14/533,319.
U.S. Patent Application for Calibrating a Volume Dimensioner filed Jun. 16, 2015 (Ackley et al.); 63 pages, U.S. Appl. No. 14/740,373.
U.S. Patent Application for Cargo Apportionment Techniques filed Feb. 5, 2015 (Morton et al.), U.S. Appl. No. 14/614,796.
U.S. Patent Application for Cloud-Based System for Reading of Decodable Indicia filed Jun. 19, 2015 (Todeschini et al.), U.S. Appl. No. 14/744,836.
U.S. Patent Application for Concatenated Expected Responses for Speech Recognition filed Nov. 7, 2014 (Braho et al.), U.S. Appl. No. 14/535,764.
U.S. Patent Application for Cordless Indicia Reader With a Multi-function Coil for Wireless Charging and EAS Deactivation, filed Jun. 24, 2015 (Xie et al.), U.S. Appl. No. 14/748,446.
U.S. Patent Application for Data Collection Module and System filed Jun. 8, 2015 (Powilleit), U.S. Appl. No. 14/732,870.
U.S. Patent Application for Decodable Indicia Reading Terminal With Combined Illumination filed Mar. 18, 2015 (Kearney et al.), U.S. Appl. No. 14/660,970.
U.S. Patent Application for Design Patiern for Secure Store filed Mar. 9, 2015 (Zhu et al.); 23 pages, U.S. Appl. No. 14/405,278.
U.S. Patent Application for Device for Supporting an Electronic Tool on a User's Hand filed Feb. 5, 2015 (Oberpriller et al.), U.S. Appl. No. 14/614,706.
U.S. Patent Application for Device Management Proxy for Secure Devices filed Apr. 1, 2015 (Yeakley et al.), U.S. Appl. No. 14/676,327.
U.S. Patent Application for Device Management Using Virtual Interfaces Cross-Reference to Related Applications filed Jun. 2, 2015 (Caballero), U.S. Appl. No. 14/728,397.
U.S. Patent Application for Device, System, and Method for Determining the Status of Checkout Lanes filed Feb. 23, 2015 (Todeschini), U.S. Appl. No. 14/628,708.
U.S. Patent Application for Dimensioning System Calibration Systems and Methods filed Apr. 6, 2015 (Laffargue et al.), U.S. Appl. No. 14/679,275.
U.S. Patent Application for Dimensioning System With Guided Alignment, filed Aug. 6, 2014 (Li et al.), U.S. Appl. No. 14/453,019.
U.S. Patent Application for Dimensioning System With Multipath Interference Mitigation filed Oct. 21, 2014 (Thuries et al.), U.S. Appl. No. 14/519,179.
U.S. Patent Application for Directing an Inspector Through an Inspection filed Nov. 3, 2014 (Miller et al.), U.S. Appl. No. 14/531,154.
U.S. Patent Application for Docking System and Method Using Near Field Communication filed Apr. 21, 2014 (Showering), U.S. Appl. No. 14/257,364.
U.S. Patent Application for Dynamic Diagnostic Indicator Generation filed Dec. 17, 2014 (Goldsmith), U.S. Appl. No. 14/573,022.
U.S. Patent Application for Electronic Device With Wireless Path Selection Capability filed May 28, 2015 (Wang et al.), U.S. Appl. No. 14/724,134.
U.S. Patent Application for Evaluating Image Values filed May 19, 2015 (Ackley), U.S. Appl. No. 14/715,916.
U.S. Patent Application for Hand-Mounted Indicia-Reading Device with Finger Motion Triggering filed Apr. 1, 2014 (Van Horn et al.), U.S. Appl. No. 14/231,898.
U.S. Patent Application for Handheld Dimensioner With Data-Quality Indication filed Oct. 21, 2014 (Laffargue et al.), U.S. Appl. No. 14/519,233.
U.S. Patent Application for Handheld Dimensioning System With Feedback filed Oct. 21, 2014 (Laffargue et al.), U.S. Appl. No. 14/519,195.
U.S. Patent Application for Handheld Dimensioning System With Measurement-Conformance Feedback filed Oct. 21, 2014 (Ackley et al.), U.S. Appl. No. 14/519,249.
U.S. Patent Application for Hands-Free Human Machine Interface Responsive to a Driver of a Vehicle filed May 6, 2015 (Fitch et al.), U.S. Appl. No. 14/705,012.
U.S. Patent Application for Identifying Inventory Items in a Storage Facility filed Oct. 14, 2014 (Singel et al.), U.S. Appl. No. 14/513,808.
U.S. Patent Application for Imaging Apparatus Comprising Image Sensor Array Having Shared Global Shutter Circuitry filed Jun. 19, 2015 (Wang), U.S. Appl. No. 14/744,633.
U.S. Patent Application for Imaging Apparatus Having Imaging Assembly filed May 29, 2015 (Barber et al.), U.S. Appl. No. 14/724,908.
U.S. Patent Application for Indicia Reader filed Apr. 1, 2015 (Huck), U.S. Appl. No. 14/676,109.
U.S. Patent Application for Indicia Reader for Size-Limited Applications filed Mar. 7, 2014 (Feng et al.), U.S. Appl. No. 14/200,405.
U.S. Patent Application for Indicia Reading System Employing Digital Gain Control filed Jun. 18, 2015 (Xian et al.), U.S. Appl. No. 14/742,818.

(56) References Cited

OTHER PUBLICATIONS

U.S. Patent Application for Indicia-reader Having Unitary Construction Scanner, filed Jan. 8, 2014 (Colavito et al.), U.S. Appl. No. 14/150,393.
U.S. Patent Application for Indicia-Reading Systems Having an Interface With a User's Nervous System filed Jun. 10, 2015 (Todeschini), U.S. Appl. No. 14/735,717.
U.S. Patent Application for Interactive Indicia Reader, filed Aug. 6, 2014 (Todeschini), U.S. Appl. No. 14/452,697.
U.S. Patent Application for Interactive User Interface for Capturing a Document in an Image Signal filed May 27, 2015 (Showering et al.), U.S. Appl. No. 14/722,608.
U.S. Patent Application for Intermediate Linear Positioning filed May 5, 2015 (Charpentier et al.); 60 pages, U.S. Appl. No. 14/704,050.
U.S. Patent Application for Laser Scanning Code Symbol Reading System, filed Jul. 24, 2014 (Xian et al.), U.S. Appl. No. 14/339,708.
U.S. Patent Application for Media Gate for Thermal Transfer Printers filed Dec. 23, 2014 (Bowles), U.S. Appl. No. 14/580,262.
U.S. Patent Application for Medication Management System filed Apr. 24, 2015 (Sewell et al.), U.S. Appl. No. 14/695,364.
U.S. Patent Application for Method and Apparatus for Reading Optical Indicia Using a Plurality of Data Sources filed May 8, 2015 (Smith et al.), U.S. Appl. No. 14/707,492.
U.S. Patent Application for Method and Application for Scanning a Barcode With a Smart Device While Continuously Running and Displaying an Application on the SI'Art Device Display filed Mar. 20, 2015 (Todeschini), U.S. Appl. No. 14/664,063.
U.S. Patent Application for Method and System for Recognizing Speech Using Wildcards in an Expected Response filed Oct. 29, 2014 (Braho et al.), U.S. Appl. No. 14/527,191.
U.S. Patent Application for Method and System to Protect Software-Based Network-Connected Devices From Advanced Persistent Threat filed May 6, 2015 (Hussey et al.), U.S. Appl. No. 14/705,407.
U.S. Patent Application for Method of and System for Detecting Object Weighing Interferences filed Jun. 12, 2015 (Amundsen et al.), U.S. Appl. No. 14/738,038.
U.S. Patent Application for Method of Programming the Default Cable Interface Software in an Indicia Reading Device filed May 29, 2015 (Barten), U.S. Appl. No. 14/724,849.
U.S. Patent Application for Methods for Training a Speech Recognition System filed Feb. 11, 2015 (Pecorari), U.S. Appl. No. 14/619,093.
U.S. Patent Application for Mobile Computing Device With Data Cognition Software, filed on Aug. 19, 2014 (Todeschini et al.), U.S. Appl. No. 14/462,801.
U.S. Patent Application for Multifunction Point of Sale Apparatus With Optical Signature Capture filed Jul. 30, 2014 (Good et al.), U.S. Appl. No. 14/446,391.
U.S. Patent Application for Multifunction Point of Sale System filed Mar. 19, 2015 (Van Horn et al.), U.S. Appl. No. 14/662,922.
U.S. Patent Application for Multiple Platform Support System and Method filed Apr. 15, 2015 (Qu et al.), U.S. Appl. No. 14/686,822.
U.S. Patent Application for Multipurpose Optical Reader, filed May 14, 2014 (Jovanovski et al.); 59 pages; now abandoned., U.S. Appl. No. 14/277,337.
U.S. Patent Application for Navigation System Configured to Integrate Motion Sensing Device Inputs filed Apr. 2, 2015 (Showering), U.S. Appl. No. 14/676,898.
U.S. Patent Application for Optical Pattern Projector filed Jun. 23, 2015 (Thuries et al.), U.S. Appl. No. 14/747,197.
U.S. Patent Application for Optical Reading Apparatus Having Variable Settings filed Jan. 21, 2015 (Chen et al.), U.S. Appl. No. 14/416,147.
U.S. Patent Application for Portable Electronic Devices Having a Separate Location Trigger Unit for Use in Controlling an Application Unit filed Nov. 3, 2014 (Bian et al. ), U.S. Appl. No. 14/398,542.
U.S. Patent Application for Pre-Paid Usage System for Encoded Information Reading Terminals filed May 13, 2 0 15 (Smith), U.S. Appl. No. 14/710,666.

U.S. Patent Application for Reprogramming System and Method for Devices Including Programming Symbol filed Mar. 18, 2015 (Soule et al.), U.S. Appl. No. 14/661,013.
U.S. Patent Application for Safety System and Method filed Dec. 22, 2014 (Ackley et al.), U.S. Appl. No. 14/578,627.
U.S. Patent Application for Secure Unatiended Network Authentication filed Apr. 24, 2015 (Kubler et al.); 52 pages, U.S. Appl. No. 14/695,923.
U.S. Patent Application for Selective Output of Decoded Message Data filed Jun. 19, 2015 (Todeschini et al.), U.S. Appl. No. 14/745,006.
U.S. Patent Application for Shelving and Package Locating Systems for Delivery Vehicles filed Jan. 6, 2015 (Payne), U.S. Appl. No. 14/590,024.
U.S. Patent Application for Symbol Reading System Having Predictive Diagnostics filed Apr. 29, 2015 (Nahill et al.), U.S. Appl. No. 14/699,436.
U.S. Patent Application for System and Method for Detecting Barcode Printing Errors filed Jan. 14, 2015 (Ackley), U.S. Appl. No. 14/596,757.
U.S. Patent Application for System and Method for Dimensioning filed Oct. 21, 2014 (Ackley et al.), U.S. Appl. No. 14/519,211.
U.S. Patent Application for System and Method for Display of Information Using a Vehicle-Mount Computer filed May 8, 2015 (Chamberlin), U.S. Appl. No. 14/707,037.
U.S. Patent Application for System and Method for Power Management of Mobile Devices filed Apr. 9, 2015 (Murawski et al.), U.S. Appl. No. 14/682,615.
U.S. Patent Application for System and Method for Regulating Barcode Data Injection Into a Running Application on a SI1art Device filed May 1, 2015 (Todeschini et al.), U.S. Appl. No. 14/702,110.
U.S. Patent Application for System and Method for Reliable Store-and-Forward Data Handling by Encoded Information Reading Terminals filed Mar. 2, 2015 (Sevier), U.S. Appl. No. 14/635,346.
U.S. Patent Application for System for Communication Via a Peripheral Hub filed Apr. 15, 2015 (Kohtz et al.), U.S. Appl. No. 14/687,289.
U.S. Patent Application for Tactile Switch for a Mobile Electronic Device filed Jun. 16, 2015 (Bandringa), U.S. Appl. No. 14/740,320.
U.S. Patent Application for Terminal Having Illumination and Focus Control filed May 21, 2014 (Liu et al.), U.S. Appl. No. 14/283,282.
U.S. Patent Application for Terminal Including Imaging Assembly filed Feb. 25, 2015 (Gomez et al.), U.S. Appl. No. 14/630,841.
U.S. Patent Application for Tracking Battery Conditions filed May 4, 2015 (Young et al.), U.S. Appl. No. 14/702,979.
U.S. Patent Application for Transforming Components of a Web Page to Voice Prompts filed Mar. 26, 2015 (Funyak et al.), U.S. Appl. No. 14/669,280.
U.S. Patent Application for Variable Depth of Field Barcode Scanner filed Sep. 10, 2014 (McCloskey et al.); 29 pages, U.S. Appl. No. 14/483,056.
U.S. Patent Application for Vehicle Mount Computer With Configurable Ignition Switch Behavior filed Mar. 20, 2015 (Davis et al.), U.S. Appl. No. 14/663,638.
U.S. Patent Application for Wireless Mesh Point Portable Data Terminal filed Jun. 18, 2015 (Wang et al.), U.S. Appl. No. 14/743,257.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/468,118 for an Electronic Device Case, filed Sep. 26, 2013 (Oberpriller et al.); 44 pages.
U.S. Appl. No. 29/486,759 for an Imaging Terminal, filed Apr. 2, 2014 (Oberpriller et al.); 8 pages.
U.S. Appl. No. 29/516,892 for Table Computer filed Feb. 6, 2015 (Bidwell et al.); 13 pages.
U.S. Appl. No. 29/519,017 for Scanner filed Mar. 2, 2015 (Zhou et al.); 11 pages.
U.S. Appl. No. 29/523,098 for Handle for a Tablet Computer filed Apr. 7, 2015 (Bidwell et al.); 17 pages.
U.S. Appl. No. 29/524,186 for Scanner filed Apr. 17, 2015 (Zhou et al.); 17 pages.

(56) References Cited

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/526,918 for Charging Base filed May 14, 2015 (Fitch et al.); 10 pages.
U.S. Appl. No. 29/528,165 for In-Counter Barcode Scanner filed May 27, 2015 (Oberpriller et al.); 13 pages.
U.S. Appl. No. 29/528,590 for Electronic Device filed May 29, 2015 (Fitch et al.); 9 pages.
U.S. Appl. No. 29/528,890 for Mobile Computer Housing filed Jun. 2. 2015 (Fitch et al.); 61 pages.
U.S. Appl. No. 29/529,441 for Indicia Reading Device filed Jun. 8, 2015 (Zhou et al.); 14 pages.
U.S. Appl. No. 29/530,600 for Cyclone filed Jun. 18, 2015 (Vargo et al).

\* cited by examiner

SMART BATTERY BALANCE SYSTEM AND METHOD

CROSS-REFERENCE TO RELATED APPLICATIONS

The present application is a continuation of and claims the benefit of priority to U.S. application Ser. No. 15/829,167 entitled "SMART BATTERY BALANCE SYSTEM AND METHOD" filed on Dec. 1, 2017, which claims the benefit of Chinese Patent Application for Invention No. 201611130208.0 for a Smart Battery Balance System and Method filed Dec. 9, 2016 at the State Intellectual Property Office of China, each of which is hereby incorporated by reference in its entirety.

FIELD OF THE INVENTION

The present invention relates to a battery balance system and method between electronic devices.

BACKGROUND

Generally speaking the use of mobile devices has become more and more popular recently for the provision of fast and convenient use. The power source of a mobile device such as a phone or scanner generally comes from a rechargeable battery, therefore charging efficiency and the durability of the battery are important issues. Nowadays, the battery of a mobile device, because of advanced technology, is available to be in "standby" mode for almost 24 hours, and it also can continuously provide power for 3 to 4 hours. Therefore, a good battery is one of the most important factors affecting the efficiency of a mobile device. However, the power of the battery for a mobile device will gradually die out when the times of usage of a mobile device increases. Based on this reason, having a good recharger for the battery to recharge the power is very important.

SUMMARY

Accordingly, in one aspect, the present invention embraces a system comprising: a mobile computing device having a first processor coupled to a first battery, wherein said first processor monitors a plurality of first charge parameters of the first battery; a portable peripheral device coupled to the mobile computing device and having a second processor coupled to a second battery, wherein said second processor monitors a plurality of second charge parameters of the second battery; and wherein the first processor is configured to compare the first charge parameters and second charge parameters to determine if the calculated empty time of the second battery is less than the first battery and if true, the second battery receives a charge from the first battery.

In one aspect of another exemplary embodiment, a system comprising: a mobile computing device having a first processor coupled to a first battery, wherein said first processor monitors a plurality of first charge parameters of the first battery; a portable peripheral device coupled to the mobile computing device and having a second processor coupled to a second battery, wherein said second processor monitors a plurality of second charge parameters of the second battery; and wherein the first processor is configured to compare the first charge parameters and second charge parameters to determine if the calculated empty time of the second battery is less than the first battery and if true, the second battery receives a charge from the first battery.

In one aspect of yet another exemplary embodiment, a method of balancing battery charges between a plurality of electronic devices comprising: monitoring a plurality of first charge parameters of a first battery by a first processor in a mobile computing device; monitoring a plurality of second charge parameters of a second battery by a second processor in a portable peripheral device coupled to the mobile computing device; comparing the first charge parameters and second charge paramaters to determine if a calculated empty time of the second battery is less than the first battery; and if true, charging the second battery from the first battery.

The foregoing illustrative summary, as well as other exemplary objectives and/or advantages of the invention, and the manner in which the same are accomplished, are further explained within the following detailed description and its accompanying drawings.

DETAILED DESCRIPTION

In Honeywell® Sled scanning products, a Sled operates with a mobile smart computing device and can charge, for example, the smart computing device's battery with its own battery. However a mobile smart computing device such as an Apple® iPhone/iTouch devices cannot charge the Sled's battery because Apple® does not support (or allow) this. Therefore, oftentimes the Sled battery will be empty while an iPhone or iTouch will still have battery energy during usage. This results in energy wasted for a whole system.

Figure 1A:
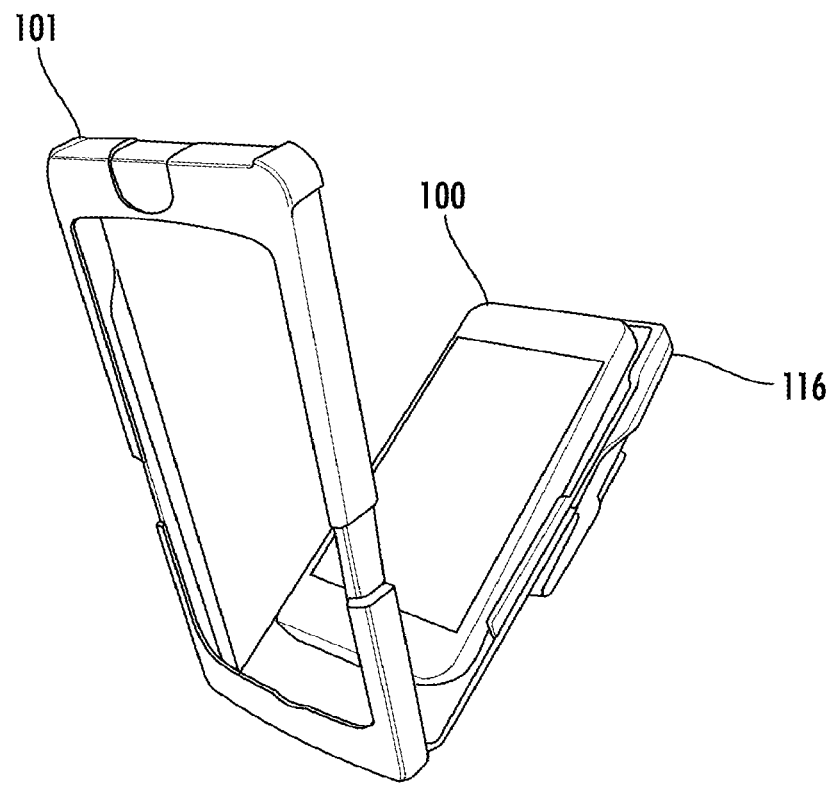
FIG. 1A depicts a mobile computing device 100 positioned in a portable peripheral 101 which is in open position.
Figure 1B:
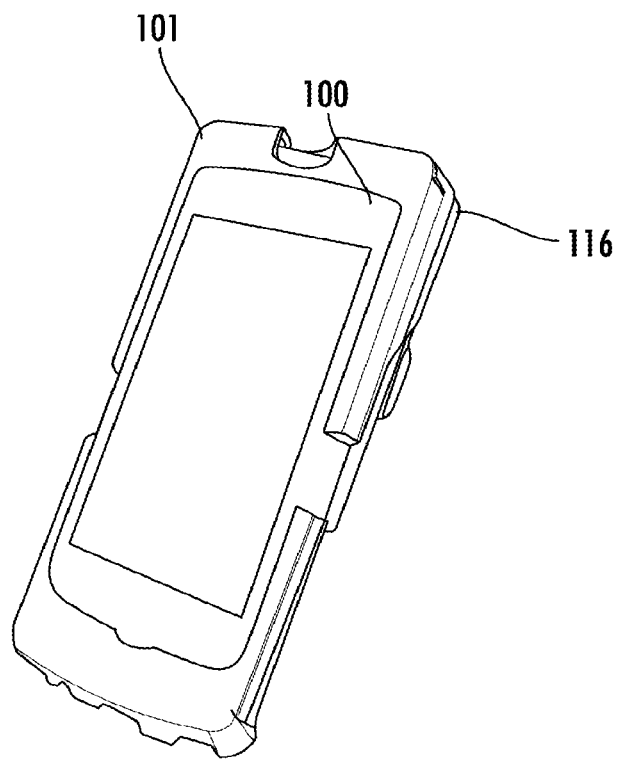
FIG. 1B depicts the mobile computing device 100 and portable peripheral 101 in operation mode.

The disclosure embraces a smart battery power balance management system and method (which may be called power balance management system or SmartCharge method herein) to maximize the operating life of a mobile computing device 100 and/or a portable peripheral 101. Portable peripheral 101 may be, for example, a peripheral having scanning or imaging capability. As shown in exemplary embodiments of FIGS. 1A and 1B, the mobile computing device 100 is capable of attaching to a chassis of portable peripheral 101 and working in conjunction with the portable peripheral 101. The mobile computing device 100 may be a handheld device and typically will slide into the portable peripheral 101 and may be snapped into place. Exemplary mobile computing devices 100 include a mobile phone, a wireless tablet device, a personal digital assistant (PDA), cellular phone, and smartphone (e.g., Apple® iPhone®, iPod® Touch®, iPad from Apple®, Android® Smartphone). Portable peripheral 101 may have a docking input/output connection port (reference 120 in FIG. 1D) for electrical attachment (and maybe physical attachment) to the mobile computing device 100. The portable peripheral 101 may also be a handheld device which configured to envelope the mobile computing device 100. Typically, when the mobile computing device 100 is in the operating position it will be partially enclosed by the portable peripheral device 101 with primarily the screen of the mobile computing device visible. In the case of Apple® products the input/output connection could be a Lightning™ connector and for Android devices a USB connection. The portable peripheral 101 transforms the mobile computing device 100 into an enterprise-ready device. The portable peripheral 101 may be a "code symbol" capturing scanner or imager which delivers fast and accurate reading of linear, two-dimensional and even poor quality bar codes. The term "code symbol" is intended broadly to refer to any machine-readable indicia that may be used to store information about an object (e.g., a barcode). An example of a portable peripheral 101 may be the Honeywell® Sled Captuvo SL22.

Upon connection of the mobile computing device 100 and the portable peripheral 101, power balance management software may be loaded from the portable peripheral 101 to the mobile computing device 100. In alternative embodiments, the power balance management software is loaded from the mobile computing device 100 to the portable peripheral 101. In other alternative embodiments it would be possible to download the power balance management software from a central site (e.g., the Apple® application store) into either or both devices 100 and 101.

Figure 1C:
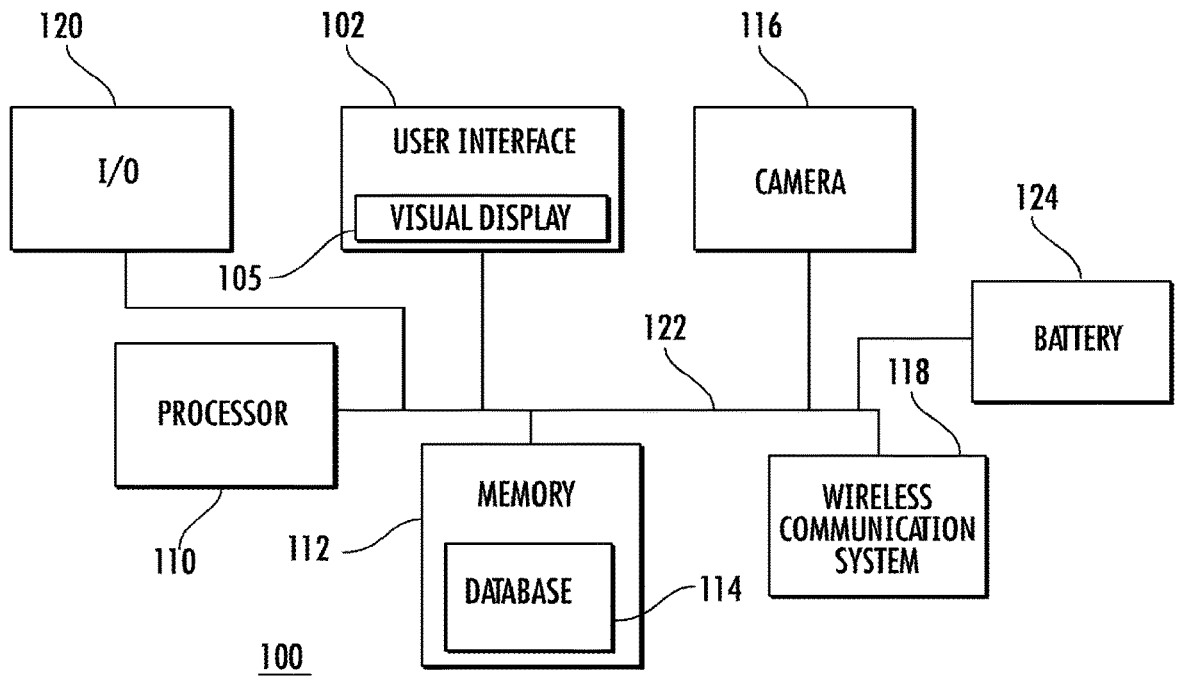
FIG. 1C schematically shows the circuitry of mobile computing device 100.

FIG. 1C illustrates that the mobile computing device 100 may broadly have a user interface system 102 including a touch screen 105 with a visual display and a soft keyboard. The mobile computing device 100 typically includes a processor (or processors) 110 having a set of stored programs ("applications"), which when executed by the processor 110, provides users with a variety of functionalities. The processor 110 is communicatively coupled with the user interface system 102, a memory 112 having a database 114, a camera 116, a wireless communication system 118, an input/output (I/O) module 120 and a battery 124. An exemplary mobile computing device 100 may include a system bus 122 and/or one or more interface circuits (not shown) for coupling the processor 110 and other components (e.g., user interface system 102, memory 112, camera 116, wireless communication system 118, I/O module 120 and battery 124) to the system bus 122 and to each other. Typically, the processor 110 is configured to execute instructions and to carry out operations associated with the mobile computing device 100. For example, using instructions retrieved from the memory 112 (e.g., a memory block), the processor 110 may control the reception and manipulation of input and output data between components of the mobile computing device 100. The processor 110 typically operates with an operating system to execute computer code and produce and use data. The operating system, other computer code, and data may reside within the memory 112 that is operatively coupled to the processor 110. The processor 110 may also download and execute any smart battery power balance management software described in detail below and also store that in memory 112. The memory 112 generally provides a place to store computer code and data that are used by the mobile computing device 100. The memory 112 may include Read-Only Memory (ROM), Random-Access Memory (RAM), a hard disk drive, and/or other non-transitory storage media. The operating system, other computer code, and data may also reside on a removable non-transitory storage medium that is loaded or installed onto the mobile computing device 100 when needed. The wireless communication system 118 enables the mobile computing device 100 to communicate with a wireless network, such as a cellular network (e.g., a GSM network, a CDMA network, or an LTE network), a local area network (LAN), and/or an ad hoc network. The I/O module 120 may be a hardwire connector which allows the mobile computing device 100 to receive power and/or data when plugged in. The I/O module 120 may also allow the mobile computing device 100 to connect to the portable peripheral 101 as discussed above. Also, connected to the I/O module 120 through bus 122 is the rechargeable battery 124 capable of providing power internally to the mobile computing device 100. The battery 124 can also provide power externally to and receive external power from the portable peripheral 101 when connected as will be discussed in detail herein. The processor 110 is also capable of monitoring the battery 124 to determine charging parameters such as percentage remaining charge, rate of charging, power consumption rate, time to empty and the like.

Figure 1D:
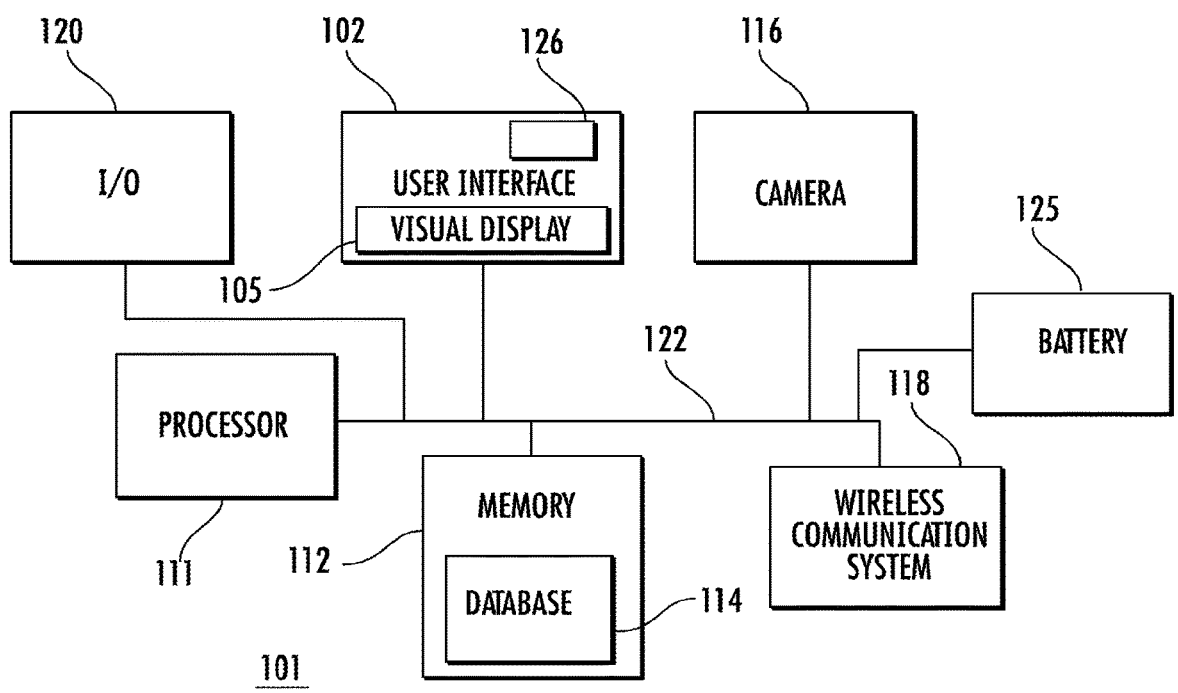
FIG. 1D schematically shows the circuitry of portable peripheral 101.

The portable peripheral 101 shown in FIG. 1D has many of the same elements functioning in the same way as the mobile computing device 100 as indicated by the same reference numerals. In the case of a scanner (or imager), the portable peripheral processor 111 may also be configured for capturing through camera 116 an image (e.g., a code symbol); displaying the image on the visual display 105; and determining whether the image is readable by the processor 111. The portable peripheral processor 111 may also enable various charging applications which are capable of monitoring portable peripheral rechargeable battery 125 to determine charging parameters such as percentage remaining charge, rate of charging, power consumption rate, time to empty and the like of battery 125. The portable peripheral 101 may also have an encryption-ready three-track magnetic stripe reader 126 in the user interface 102 which can be integrated, facilitating quick and easy processing of credit card transactions in the portable peripheral 101.

Compatibility with the mobile computing device 100 provides operators of the portable peripheral 101 access to a myriad of applications through the mobile computing device 100 from an online downloadable store. An example of mobile computing device 100 would be an Apple® iPhone which works with the Apple® Application Store to allow the operator of the iPhone to be armed with a tremendous amount of information. When equipped with software such as Honeywell's Remote MasterMind™ 3.0 software, operators of the portable peripheral 101 can remotely work with and/or manage a deployed mobile computing device 100 leading to a lower total cost of ownership. The protective housing of the portable peripheral 101 also adds durability to the mobile computing device 100 resulting in a combination that lowers the failure rate of the mobile computing device 100. As with the mobile computing device 100, in the portable peripheral 101 the I/O module 120 is connected through bus 122 to the rechargeable battery 125 and is capable of providing power to the portable peripheral 101 (and the mobile computing device battery 124) as discussed in detail herein.

Figure 2A:
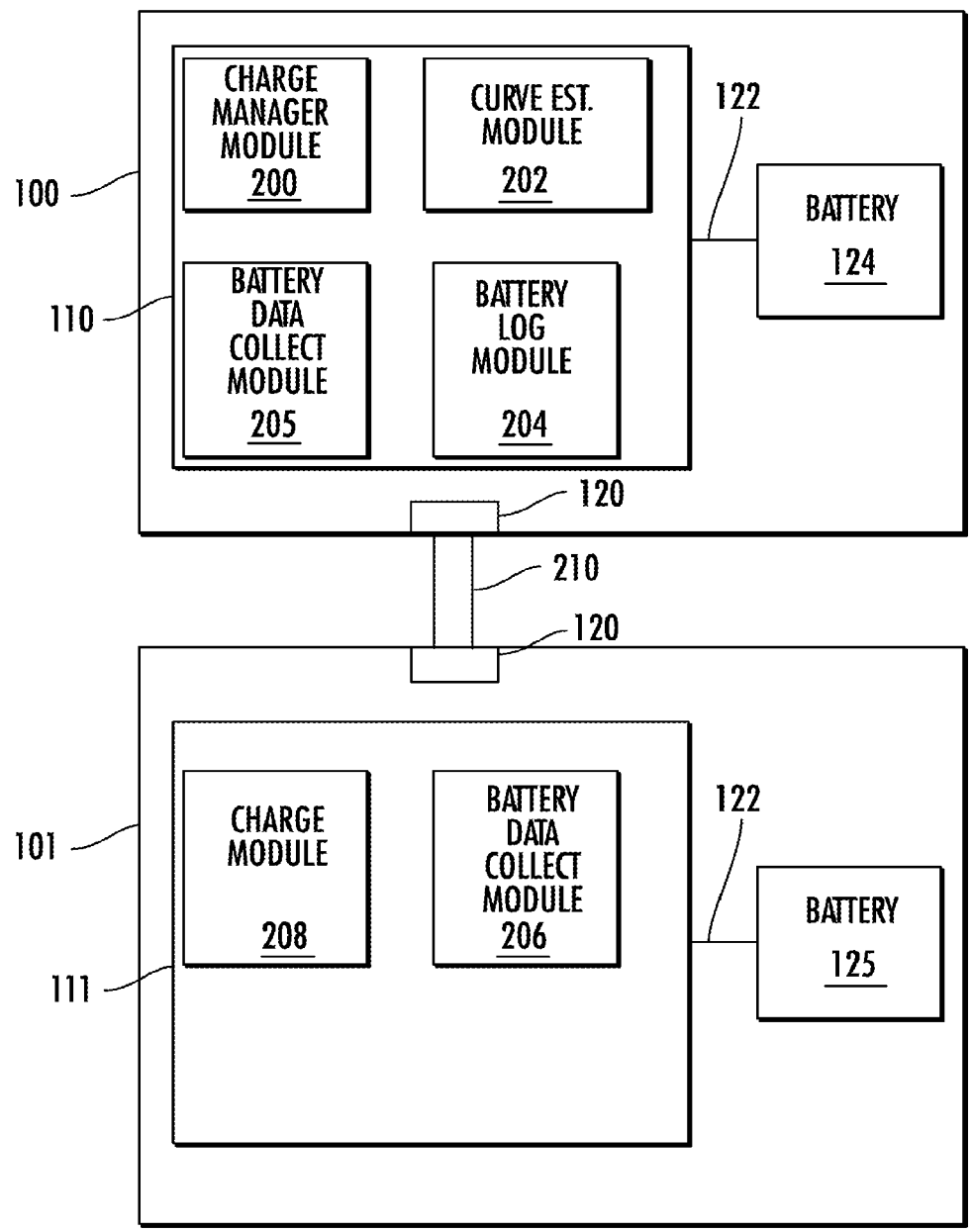
FIG. 2A schematically depicts an embodiment of the mobile computing device 100 and the portable peripheral 101 with a charge manager module 200, curve estimation module, and battery log module located on the mobile computing device 100.

FIG. 2A discloses a charge manager software module 200, curve filling estimation software module 202 ("curve estimation module"), a battery log 204, and a battery data collect module 205 running on the mobile computing device processor 110. A counterpart in the portable peripheral 101 to battery data collect module 205 is battery data collect module 206 which runs on the processor of the portable peripheral. Also running on the portable peripheral processor 111 is charge module 208 which takes direction from charge manager software module 200 and controls charging to and from the rechargeable battery 125. Elements 200, 202, 204, 205, 206, and 208 help make up the power balance management system and method described herein.

Element 210 in FIG. 2A stands for a connection interface between the I/O 120 of the mobile computing device 100 and I/O 120 of the portable peripheral 101. In the case where the mobile computing device 100 is an iPhone/iTouch the interface connection hardware may be a Lightning™ connector and may use iAP2 protocol software which is an Apple® accessory protocol to pass data back and forth. In the case where device 101 is an Android® phone a USB connector may be used with Android Open Accessory (AOA) protocol to pass data back and forth.

Charge manager software module 200 is the primary software with a user interface which may be displayed on the mobile computing device visual display 105 or on the portable peripheral visual display 105. One of the functions of the charge manager software module 200 is to check whether the operator has enabled the power balance management system functionality (i.e., Smartcharge) or not. If yes, software module 200 will start the battery power balance process. If not, it will not start the battery power balance method and will notify processors 110 and 111 to use a normal charge method. Curve filling estimation software module 202 performs a curve fitting and estimation to predict the empty time for complete battery discharge of the batteries 124, 125 of the mobile computing device 100 and portable peripheral 101 based on parameters obtained by monitoring the batteries 124, 125. Battery log 204 is configured to store history date of batteries 124 and 125. Mobile computing device battery data collect module 205 will be used to collect mobile computing device battery's 124 parameters (such as battery percentage of available power (Pp), power consumption, time to empty, and the like) through iOS™ or an Android® API and send them to the other modules 200, 202, and 204. Similarly, portable peripheral battery data collect module 206 shall be used to collect portable peripheral battery's 125 parameters (similar to battery 124, information such as battery percentage of available power (Ps), power consumption, time to empty, and the like) through the portable peripheral's API and forward them to modules 200, 202, and 204. Charge module 208 may be used to control the hardware of the portable peripheral 101 to enable or disable the charging of the mobile computing device battery 124 by the portable peripheral battery 125 during normal charging operations as well as permit charging of the portable peripheral battery 125 by the mobile computing device battery 124 during enablement of the power balance management system. Charge module 208 will receive instructions from charge manager module 200 on when to perform these functions.

The charge manager module 200 will obtain the parameters (e.g., Pp, Ps) from the collection modules 205 and 206. The charge manager module 200 can analyze these parameters to decide when to let the portable peripheral battery 125 charge the mobile portable computing device battery 124 and when to stop the portable peripheral 101 from charging the mobile computing device 100. The smart battery balance system and process can also use these parameters to decide when to let the mobile portable computing device battery 124 charge the portable peripheral battery 125 and when to stop the mobile computing device 100 from charging the portable peripheral 101. The charge manager module 200 may also use the battery parameters to determine the rate (or velocity) of battery consumption of mobile computing device 100 (Vp) and portable peripheral 101 (Vs). The battery empty time can then be predicted for the mobile computing device 100 (Tp) and the portable peripheral 101 (Ts). The charge manager module 200 may use a first method to obtain a prediction of the empty time (T) is to divide current battery percentage (P) with average battery consuming velocity ($V_{mean}$) (i.e., $T=P/V_{mean}$). Another method the charge manager module 200 may use to procure the predicted empty time of the batteries 124, 125 is to analyze historic battery percentage data and time to get a trend line for when the battery will be empty.

The charge manager module 200 will enable battery charging automatically and dynamically (i.e., constant change between charging and not charging) of the portable peripheral battery 125 (and also the mobile computing device battery 125). If the portable peripheral battery 125 empty time is longer than mobile computing device battery 124 empty time, then the smart battery balance process will let portable peripheral 101 charge the mobile computing device battery 124. If mobile computing device's battery 124 empty time is longer than portable peripheral's battery 125 empty time, then the smart battery power balance system and process will either stop portable peripheral 101 from charging the mobile computing device battery 124 or will actually have the mobile computing device 100 charge the rechargeable battery 125 of the portable peripheral. The idea is to maximize the battery life for the whole system so the mobile computing device battery 124 empty time is still maintained longer than the portable peripheral battery 125 empty time, but a more a balanced charge is maintained between the two devices. Because if nothing is done, the portable peripheral's battery 125 will be substantially 0% while the mobile computing device battery 124 is not and an operator cannot use the portable peripheral 101 to perform functions such as barcode scanning. With this battery power balancing system and process described herein enabled, it is possible to obtain the maximum uptime for both device 100 and peripheral 101.

Figure 2B:
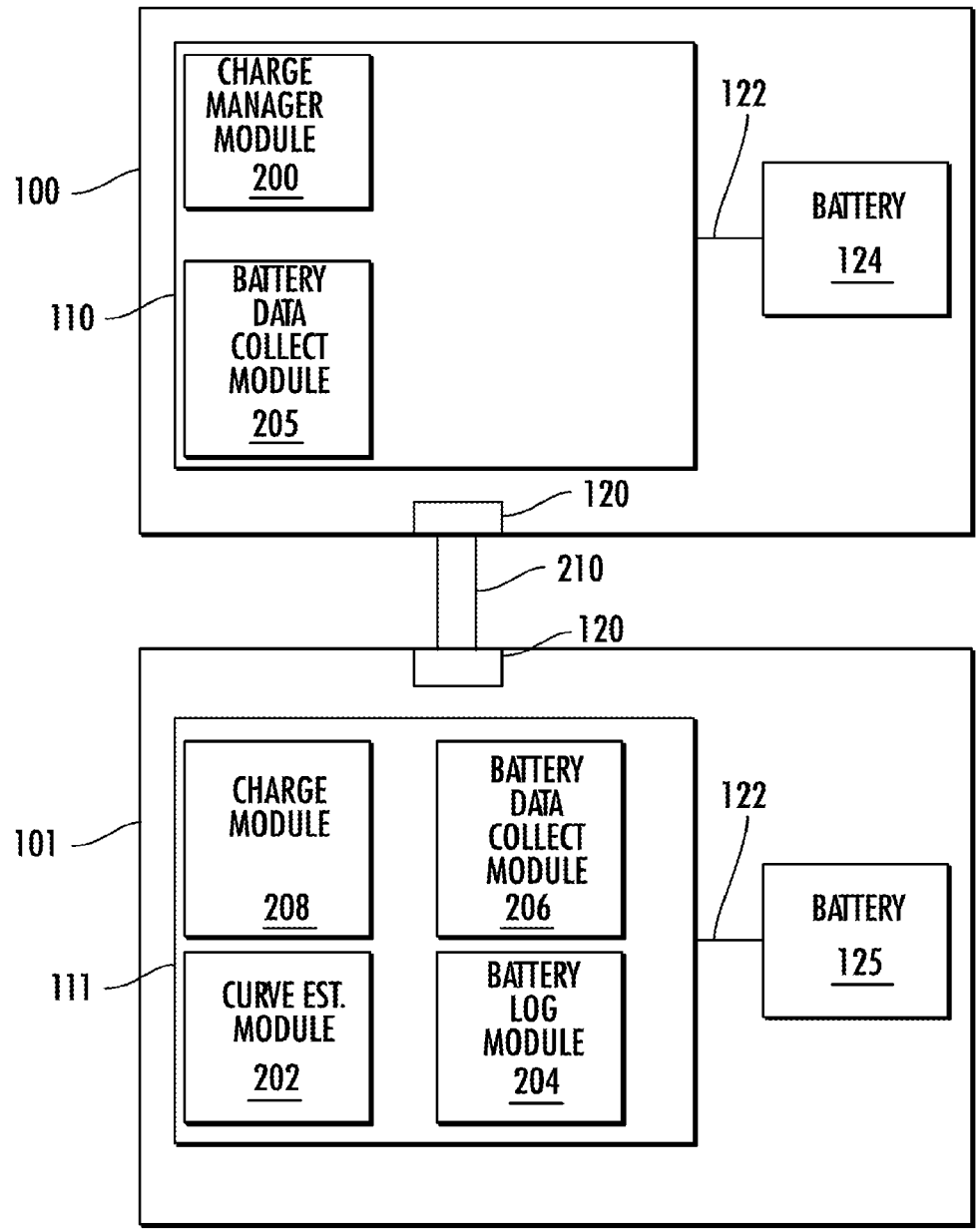
FIG. 2B schematically depicts another embodiment of the mobile computing device 100 and the portable peripheral 101 with the charge manager module located on the mobile computing device 100 and the curve estimation module and battery log module located on the peripheral device.

FIG. 2B shows an alternative embodiment of the system of FIG. 2A. In this embodiment, the charge manager module 200 is located in the mobile computing device and running on processor 110. However, the curve estimation module 202 and battery log module 204 are running and performing their functions as described above on the portable peripheral 101 instead of the mobile device 100.

Figure 2C:
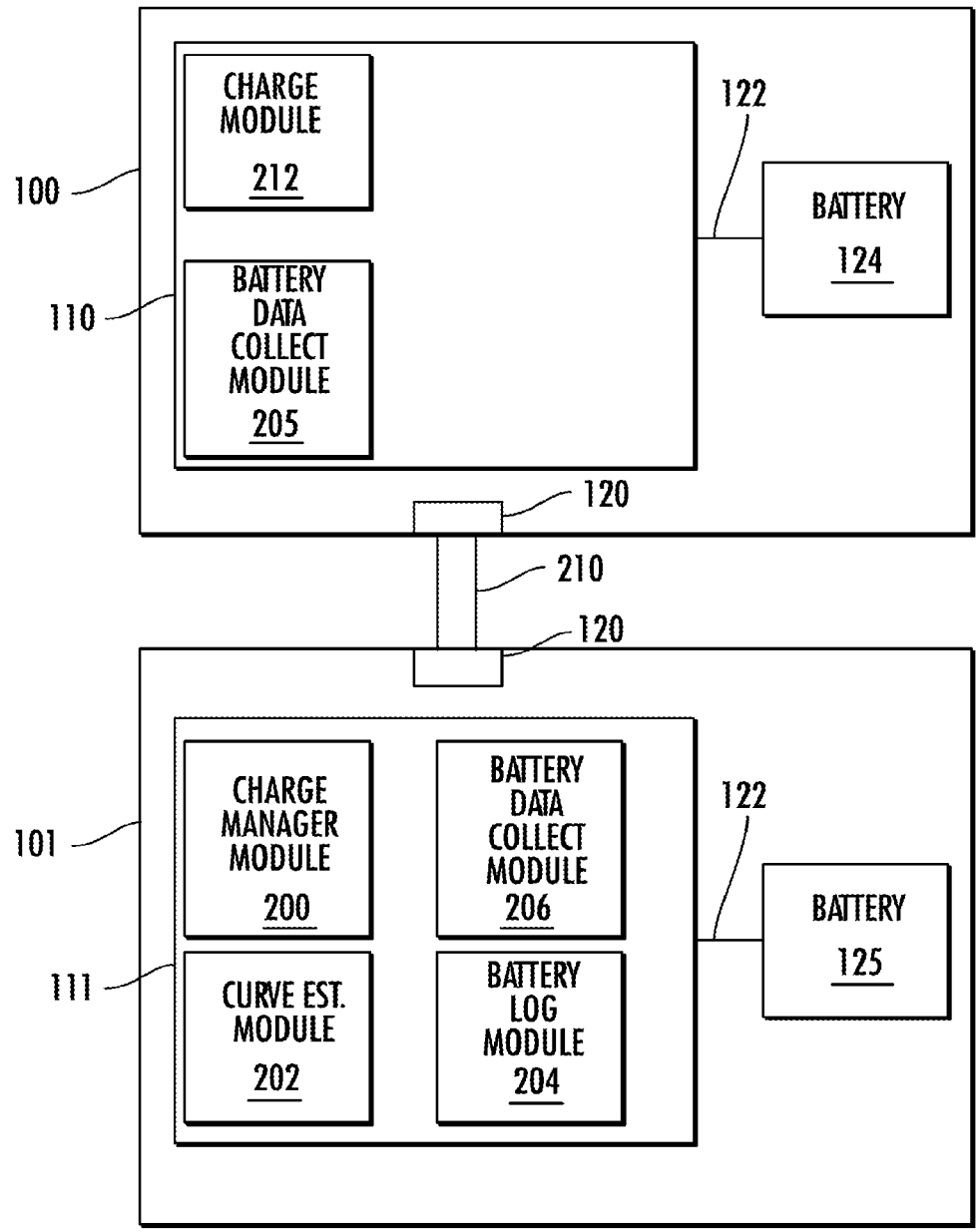
FIG. 2C schematically depicts another embodiment of the mobile computing device 100 and the portable peripheral 101 with the charge manager module, the curve estimation module and battery log module located on the peripheral device.

FIG. 2C shows another alternative embodiment of the systems of 2A and 2B. In this embodiment, the charge manager module 200, curve estimation module 202 and battery log module 204 are performing their functions but are all located in the portable peripheral. In this case, charge manager module will manage the charge of battery 125 and charge module 212 under instructions from module 200 will conduct charging operations of battery 124.

Figure 3:
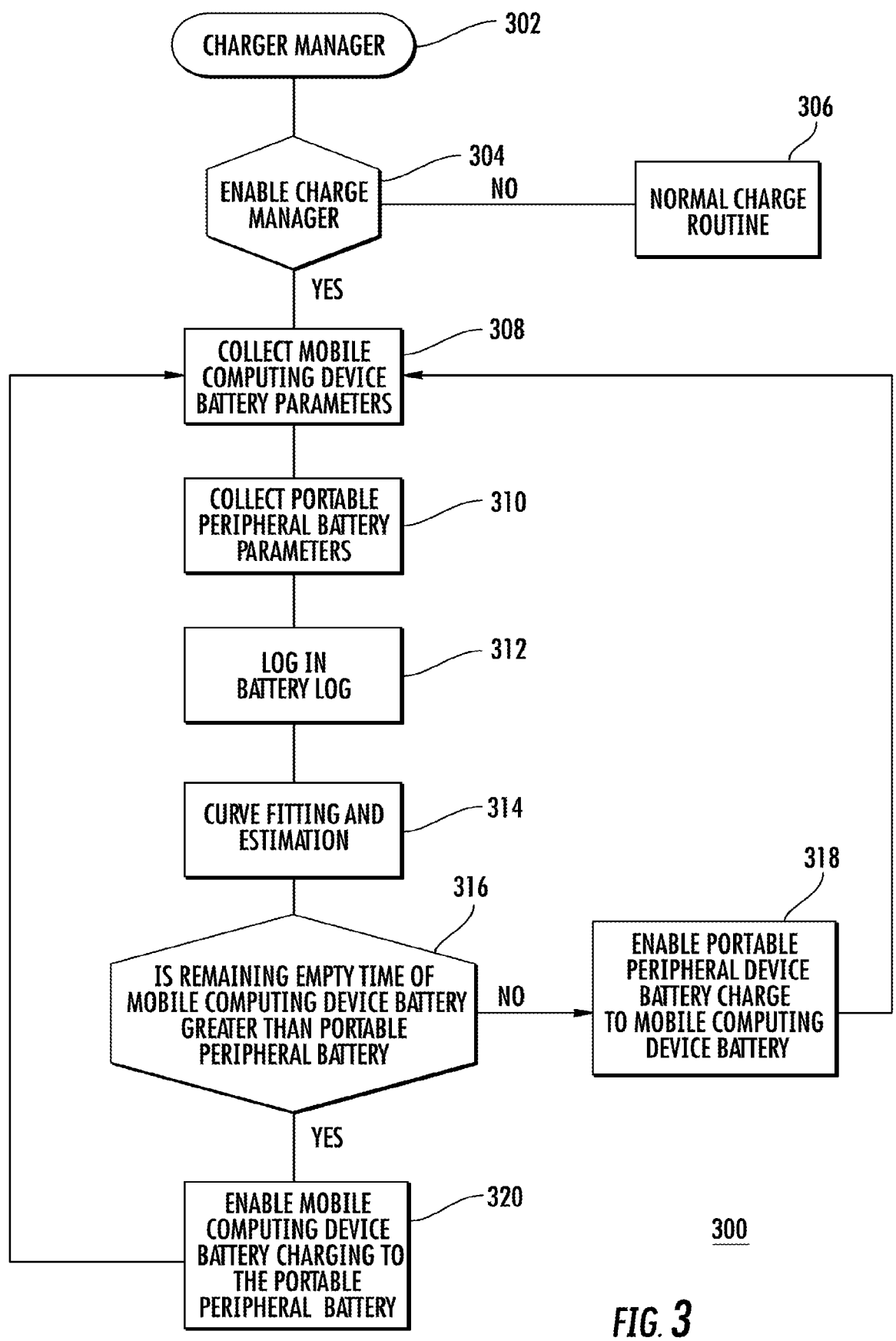
FIG. 3 illustrates a flowchart of the smart battery balance system and method of this disclosure.

FIG. 3 shows a flowchart 300 of the process of the smart battery power balance management system. As described above, elements of the charging software (e.g., charge manager module 200, curve estimation module 202, battery log module 204, battery data collect modules 204, 206) may reside on both (or either of) the mobile computing device 100 and the portable peripheral 101 in the processors 110 and 111. Some portions are running on processor 110 and some are running on processor 111. The charge manager module software 200 is booted in step 302 in the mobile computing device 100 and the portable peripheral 101. In step 304, the battery power balance enablement decision is made. The battery power balance method can be enabled or disabled. If the operator chooses to enable, then the system will use the method described herein to maximize the whole battery life for both the mobile computing device 100 and portable peripheral 101 and proceed to step 308. If the operator chooses to disable the smart battery balance method (i.e., not use steps 308, 310, 312, 314, 316, 318, and 320), then in step 306 a normal charge routine is executed whereby the mobile computing device battery 124 is just charged when running low or becomes empty by the portable peripheral device battery 125. In this scenario, the portable peripheral 101 will keep charging the mobile computing device 100 no matter what the portable peripheral battery 125 percentage is or the portable peripheral 101 will charge the mobile computing device battery 124 at a pre-defined portable peripheral battery voltage range.

If enabled, in steps 308 and 310 the mobile computing device battery 124 and portable peripheral battery 125 parameters such as battery level, velocity/rate of consumption and usage history are collected by their respective processors (110 and 111) in modules 204, 206 and logged in step 312 in the battery log 204. In step 314, a curve fitting and estimation is done in curve estimation module 202 to predict the empty time for complete battery discharge of the device battery 124 and portable peripheral battery 125. As discussed above, equation $T=P/V_{mean}$ may be used to obtain the remaining battery hours. However, curve fitting and estimation may obtain a better estimate of a trend line using least squares method or linear regression to estimate the battery remaining time. In step 316, the portable peripheral remaining charge in the portable peripheral battery 125 is calculated. If the calculated empty time of the mobile computing device battery 124 is less than the portable peripheral battery 125 (i.e., "yes"), the process proceeds to step 318 and the portable peripheral charges the mobile computing device battery 124 and reverts to step 308. If in step 316, the calculated empty time of the mobile computing device battery 124 is greater than that of the portable peripheral battery 125 (i.e., "no"), the process proceeds to step 318. In this case, the portable peripheral battery 125 charging of the mobile computing device battery is disabled. In addition, the portable peripheral battery 125 may receive charging from the mobile computing device battery 124. The process then reverts back to step 308. The battery balancing steps are running regularly in a continuous loop of the steps in FIG. 3, so the battery charging from the mobile computing device 100 adjusts dynamically depending on the battery remaining hours calculation of the mobile computing device battery 124 and portable peripheral battery 125.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;

U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;

U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

What is claimed is:

1. A portable peripheral device comprising:
a processor coupled to a first battery, wherein the processor is configured to:
  enable a charge manager in the portable peripheral device, wherein the charge manager is configured to:
    calculate a first discharge time for the first battery based on at least one first charge parameter for the first battery; and
    calculate a second discharge time for a second battery associated with a mobile computing device, based on at least one second charge parameter for the second battery, wherein the portable peripheral device is coupled to the mobile computing device, and wherein the second battery is charged using the first battery;
  compare the first discharge time for the first battery to the second discharge time for the second battery; and
  disable charging of the second battery by the first battery, in response to a determination that the first discharge time for the first battery is less than the second discharge time for the second battery.

2. The portable peripheral device of claim 1, wherein the processor is further configured to enable charging of the first battery by the second battery, in response to the determination that the first discharge time for the first battery is less than the second discharge time for the second battery.

3. The portable peripheral device of claim 1, wherein the processor is further configured to receive an input for enabling balancing of battery charges for the first battery and the second battery.

4. The portable peripheral device of claim 1, wherein the mobile computing device and the portable peripheral device are physically and electrically attached.

5. The portable peripheral device of claim 1, wherein:
the at least one first charge parameter comprises at least one of a current battery percentage of the first battery, a power consumption rate of the first battery, time for complete discharge for the first battery, a rate of charging the first battery, and usage history of the first battery; and
the at least one second charge parameter comprises at least one of a current battery percentage of the second battery, a power consumption rate of the second battery, time for complete discharge for the second battery, a rate of charging the second battery, and usage history of the second battery.

6. The portable peripheral device of claim 1, wherein the processor is further configured to:
analyze the at least one first charge parameter and the at least one second charge parameter to perform curve fitting and estimation to predict the first discharge time for the first battery and the second discharge time for the second battery.

7. The portable peripheral device of claim 1, wherein the processor is further configured to:
predict the first discharge time for the first battery by dividing a current battery percentage of the first battery with an average battery consuming velocity for the first battery; and
predict the second discharge time for the second battery by dividing a current battery percentage of the second battery with an average battery consuming velocity for the second battery.

8. The portable peripheral device of claim 1, wherein the processor is further configured to:

predict the first discharge time for the first battery by analyzing historic battery percentage data versus time to calculate a trend line for the first battery; and predict the second discharge time for the second battery by analyzing historic battery percentage data versus time to calculate a trend line for the second battery.

9. The portable peripheral device of claim 2, wherein the processor is further configured to:

dynamically adjust the charging of the first battery by the second battery, based on the first discharge time for the first battery and the second discharge time for the second battery.

10. The portable peripheral device of claim 1, wherein the processor is further configured to analyze the at least one first parameter and the at least one second parameter using one of least squares method and linear regression to predict the first discharge time for the first battery and the second discharge time for the second battery.

11. A mobile computing device comprising:

a processor coupled to a first battery, wherein the processor is configured to:

enable a charge manager in the mobile computing device, wherein the charge manager is configured to:

calculate a first discharge time for the first battery based on at least one first charge parameter for the first battery; and calculate a second discharge time for a second battery associated with a portable peripheral device, based on at least one second charge parameter for the second battery, wherein the mobile computing device is coupled to the portable peripheral device, and wherein the first battery is charged using the second battery;

compare the first discharge time for the first battery to the second discharge time for the second battery; and disable charging of the first battery by the second battery, in response to a determination that the second discharge time for the second battery is less than the first discharge time for the first battery.

12. The mobile computing device of claim 11, wherein the processor is further configured to enable charging of the second battery by the first battery, in response to the determination that the second discharge time for the second battery is less than the first discharge time for the first battery.

13. The mobile computing device of claim 11, wherein the processor is further configured to receive an input for enabling balancing of battery charges for the first battery and the second battery.

14. The mobile computing device of claim 11, wherein the mobile computing device and the portable peripheral device are physically and electrically attached when the mobile computing device is in an operating position.

15. The mobile computing device of claim 11, wherein:

the at least one first charge parameter comprises at least one of a current battery percentage of the first battery, a power consumption rate of the first battery, time for complete discharge for the first battery, a rate of charging the first battery, and usage history of the first battery; and the at least one second charge parameter comprises at least one of a current battery percentage of the second battery, a power consumption rate of the second battery, time for complete discharge for the second battery, a rate of charging the second battery, and usage history of the second battery.

16. The mobile computing device of claim 11, wherein the processor is further configured to analyze the at least one first charge parameter and the at least one second charge parameter using one of least squares method and linear regression to predict the first discharge time for the first battery and the second discharge time for the second battery.

17. The mobile computing device of claim 11, wherein the processor is further configured to:

predict the first discharge time for the first battery by dividing a current battery percentage of the first battery with an average battery consuming velocity for the first battery; and predict the second discharge time for the second battery by dividing a current battery percentage of the second battery with an average battery consuming velocity for the second battery.

18. The mobile computing device of claim 12, wherein the processor is further configured to dynamically adjust the charging of the second battery by the first battery, based on the first discharge time for the first battery and the second discharge time for the second battery.

19. A method comprising:

calculating, by a charge manager enabled by a processor associated with a mobile computing device:

a first discharge time for a first battery associated with the mobile computing device, based on at least one first charge parameter for the first battery; and a second discharge time for a second battery associated with a portable peripheral device, based on at least one second charge parameter for the second battery, wherein the mobile computing device is coupled to the portable peripheral device, and wherein the first battery is charged using the second battery;

comparing, by the processor, the first discharge time for the first battery to the second discharge time for the second battery; and disabling, by the processor, charging of the first battery by the second battery, in response to a determination that the second discharge time for the second battery is less than the first discharge time for the first battery.

20. The method of claim 19, further comprising:

enabling, by the processor, charging of the second battery by the first battery, in response to the determination that the second discharge time for the second battery is less than the first discharge time for the first battery.

* * * * *